United States Patent
Ban et al.

(10) Patent No.: US 8,121,731 B2
(45) Date of Patent: Feb. 21, 2012

(54) TEACHING POSITION CORRECTING APPARATUS AND TEACHING POSITION CORRECTION METHOD

(75) Inventors: Kazunori Ban, Yamanashi (JP); Ichiro Kanno, Kanagawa (JP); Gang Shen, Yamanashi (JP); Katsutoshi Takizawa, Tokyo (JP)

(73) Assignee: Fanuc Ltd, Yamanashi (JP)

( * ) Notice: Subject to any disclaimer, the term of this patent is extended or adjusted under 35 U.S.C. 154(b) by 420 days.

(21) Appl. No.: 11/684,503

(22) Filed: Mar. 9, 2007

(65) Prior Publication Data

US 2007/0213873 A1    Sep. 13, 2007

(30) Foreign Application Priority Data

Mar. 13, 2006    (JP) .................................. 2006-067732

(51) Int. Cl.
*B25J 9/22*    (2006.01)

(52) U.S. Cl. ................ 700/254; 700/245; 901/2; 901/3; 901/4; 901/5; 901/9

(58) Field of Classification Search .................. 700/245, 700/254; 901/1–5, 9, 10
See application file for complete search history.

(56) References Cited

U.S. PATENT DOCUMENTS

| | | | | |
|---|---|---|---|---|
| 4,817,017 A | * | 3/1989 | Kato | .............................. 700/254 |
| 5,315,222 A | * | 5/1994 | Kasagami et al. | ....... 318/568.11 |
| 5,920,678 A | * | 7/1999 | Watanabe et al. | ............. 700/255 |
| 7,376,488 B2 | | 5/2008 | Watanabe et al. | |
| 2004/0172168 A1 | * | 9/2004 | Watanabe et al. | ............. 700/264 |
| 2004/0186627 A1 | * | 9/2004 | Watanabe et al. | ............. 700/264 |
| 2004/0193320 A1 | * | 9/2004 | Watanabe et al. | ............. 700/245 |
| 2005/0049749 A1 | | 3/2005 | Watanabe et al. | |

FOREIGN PATENT DOCUMENTS

| | | |
|---|---|---|
| EP | 1462224 A2 | 9/2004 |
| EP | 1712969 A2 | 10/2006 |
| JP | 4-255003 A | 9/1992 |
| JP | 05019840 A | 1/1993 |
| JP | 2004-280529 A | 10/2004 |
| JP | 2005-066797 A | 3/2005 |
| JP | 2005149299 A | 6/2005 |

OTHER PUBLICATIONS

Notice of Reasons for Rejection of Patent Application No. 2006-067732 mailed Feb. 5, 2008.
EP Search Report for EP 07004540 dated Dec. 21, 2010.

* cited by examiner

*Primary Examiner* — Thomas Black
*Assistant Examiner* — Peter D Nolan
(74) *Attorney, Agent, or Firm* — Lowe Hauptman Ham & Berner LLP

(57) ABSTRACT

A teaching position correcting apparatus corrects plural teaching point positions of a robot in a robot operation program, by sequentially moving the robot to each of the plural teaching points and by sequentially reading a current position of the robot at each of the plural teaching points. The apparatus includes: a position correction amount calculating unit that calculates a position correction amount, based on corrected teaching point positions and teaching point positions before correction; and a corrected-position calculating unit that calculates corrected positions of teaching point positions before correction out of the plural teaching points, based on the position correction amount. At the time of moving the robot to uncorrected teaching points, a moving unit moves the robot to corrected positions of the teaching point positions before correction.

9 Claims, 7 Drawing Sheets

TEACHING POSITION CORRECTING APPARATUS AND TEACHING POSITION CORRECTION METHOD

BACKGROUND OF THE INVENTION

1. Field of the Invention

The present invention relates to a teaching position correcting apparatus and a teaching position correction method for correcting positions of plural teaching points in an operation program of a robot.

2. Description of the Related Art

When a relative position or a posture, between a robot and a workpiece, changes due to a change in a set position of the robot or the workpiece, the teaching position of the robot operation program, which is already prepared, must be corrected. This correction operation is particularly necessary when the robot and a relevant facility are transported to an overseas plant, after the robot operation is confirmed following the setting of the robot and teaching of the robot operation in Japan. Further, even when the robot is moved from a certain position to another position within the same plant, this correction operation is also necessary.

An operation program prepared by an offline program also needs to be corrected in the field so that positions of teaching points (teaching point positions) of the robot operation program prepared offline are matched with an actual set position of a workpiece, using an error between the positions of the robot and the workpiece set in the offline and the positions of the robot and the workpiece actually set.

Teaching point data of the robot program usually includes information of a position and a posture of a work tool. Correction of a teaching point includes correction of either one of or both a position of a teaching point and a posture in an existing program.

The teaching point correction operation in a robot operation program is carried out by playing-back a taught robot program at each teaching point at steps at a low speed while confirming the position of each teaching point. Specifically, the robot is stopped immediately before a teaching point in such a manner that the robot or a work tool of the robot is not brought into contact with the workpiece. Next, an operator manipulates a button of a teaching console to move the robot by jog feeding. With this arrangement, the position and the posture of the robot are corrected to match a desired position and a desired posture. The operator manually carries out this correction operation of a teaching point in the robot program. Therefore, considerable amount of time is necessary for this operation. In order to improve the efficiency of the correction operation, various methods have been conventionally proposed.

In Japanese Unexamined Patent Publication No. 4-255003, for example, a robot touches (touches up) three or four predetermined points of a workpiece. In other words, the operator manually moves the robot to match a tool front end of the robot with these predetermined points. Disposition data of the workpiece is calculated from the obtained three or four position data, and the operation program is corrected based on a difference between the disposition data and disposition data obtained offline.

However, according to a method disclosed in Japanese Unexamined Patent Publication No. 4-255003, the robot needs to be manually moved to carry out a touch up operation at plural positions. Therefore, additional time is necessary to carry out the touch up operation. Even when a slight error is present at a position of the front end of the tool of the robot, precision of the correction operation decreases. Further, when a distribution of plural predetermined points for touch up operation is not suitable, disposition data of the workpiece cannot be calculated accurately. Thus, precision of the correction operation also decreases in this case.

To cope with this situation, Japanese Unexamined Patent Publication No. 2004-280529 and a Japanese Unexamined Patent Publication No. 2005-66797 disclose other methods which do not require a touch up operation. These methods disclosed in Japanese Unexamined Patent Publication No. 2004-280529 and Japanese Unexamined Patent Publication No. 2005-66797 are to calculate a position correction amount for a certain teaching point and automatically correct positions of other teaching points based on this position correction amount.

However, in executing the methods disclosed in Japanese Unexamined Patent Publication No. 2004-280529 and Japanese Unexamined Patent Publication No. 2005-66797, it is necessary that a posture change is small and teaching points are continuous. When a posture change is relatively large, the method disclosed in Japanese Unexamined Patent Publication No. 2004-280529 and Japanese Unexamined Patent Publication No. 2005-66797 cannot be used. In order to obtain a position correction amount from one teaching point, a position and a posture of the tool need to be set accurately. However, in actual practice, there is a limit to the operator accurately and visually setting a position and a posture of the tool.

Further, according to the methods disclosed in Japanese Unexamined Patent Publication No. 2004-280529 and Japanese Unexamined Patent Publication No. 2005-66797, when correcting plural programs to carry out operation to the workpiece at the same position, similar correction operation needs to be carried out to these programs.

The present invention has been made in the light of the above problems. It is an object of the present invention to provide a teaching position correcting apparatus and a teaching position correction method capable of accurately correcting positions of teaching points in a robot program in short time.

SUMMARY OF THE INVENTION

In order to achieve the above object, according to a first aspect of the present invention, there is provided a teaching position correcting apparatus that corrects plural teaching point positions of a robot in a robot operation program and, in the teaching position correcting apparatus, plural teaching point positions in the operation program are corrected by moving the robot to each of plural teaching points and by reading a current position of the robot at each of the plural teaching points, the teaching point correcting apparatus including: a position correction amount calculating means that calculates a position correction amount of teaching point positions before correction (that is, uncorrected teaching point positions), based on corrected teaching point positions out of the plural teaching point positions and the teaching point positions before correction corresponding to the corrected teaching point positions; a corrected-position calculating means that calculates corrected positions for teaching point positions before correction out of the plural teaching points, based on the position correction amount calculated by the position correction amount calculating unit; and a moving means that moves the robot to corrected positions of the teaching point positions before correction calculated by the corrected-position calculating means, at the time of moving the robot to the teaching points before correction.

In other words, according to the first aspect, the robot is moved to a corrected position of a teaching point position before correction obtained based on a position correction amount, in the correction operation of plural teaching point positions. The corrected position becomes relatively close to a corrected position of the teaching point. Therefore, a robot moving distance after the robot is moved to the corrected position becomes short, thereby shortening the time required for the correction operation. When the number of corrected teaching point positions increases by sequentially carrying out the correction operation, precision of the position correction amount becomes high. Therefore, even when a posture change of the robot or a tool is relatively large, a robot moving distance from the corrected teaching point position can be further shortened. Accordingly, the correction operation can be carried out accurately in a short time. All the remaining teaching point positions before correction at the time of obtaining the position correction amount can be collectively corrected. In this case, all the plural teaching point positions do not need to be corrected. As a result, the correction operation can be carried out in a shorter time.

According to a second aspect, an offline programming apparatus generates the robot operation program in the first aspect.

In other words, according to the second aspect, it is easy to carry out the correction operation of the operation program which is necessary at the time of applying the operation program prepared by the offline programming apparatus to the actual robot.

According to a third aspect, in the first aspect, the operation program is generated before a relative positional relationship between the robot and the workpiece changes, and the teaching point position is corrected after a relative positional relationship between the robot and the workpiece changes.

In other words, according to the third aspect, it is easy to carry out the correction operation of the operation program which is necessary when a relative positional relationship between the robot and the workpiece changes, for example, when a robot system is moved from a certain plant to other plant, or when the robot system is moved to a different position within the same plant.

According to a fourth aspect, in the first aspect, the teaching point position before correction is within an operation program which is the same as the operation program containing the corrected teaching point position.

In other words, according to the fourth aspect, remaining teaching points before correction can be corrected accurately, based on a position correction amount obtained by the same operation program.

According to a fifth aspect, in the first aspect, the teaching point position before correction is within an operation program different from the operation program containing the corrected teaching point position.

In other words, according to the fifth aspect, teaching points of the operation program can be collectively corrected, based on a position correction amount obtained by a separate operation program.

According to a sixth aspect, in the first aspect, the position correction amount calculating means recalculates the position correction amount each time when one or plural teaching points are corrected.

In other words, according to the sixth aspect, a position correction amount with higher precision can be obtained.

According to a seventh aspect, in the first aspect, the teaching position correcting apparatus further includes a teaching console for the robot, wherein calculating the position correction amount by the position correction amount calculating means, and calculating a corrected position of the teaching point position before correction by the corrected-position calculating means, are conducted through the teaching console.

In other words, according to the seventh aspect, calculation of a position correction amount can be easily done using the teaching console.

According to an eighth aspect, there is provided a teaching position correction method for correcting plural teaching point positions of a robot in a robot operation program, in the teaching position correcting method, plural teaching point positions in the operation program are corrected by moving the robot to each of plural teaching points and by reading a current position of the robot at each of the plural teaching points, the teaching point correction method includes a step of: calculating a position correction amount for teaching point positions before correction, based on corrected teaching point positions out of the plural teaching point positions and the teaching point positions before correction corresponding to the corrected teaching point positions; calculating corrected positions for teaching point positions before correction out of the plural teaching points, based on the position correction amount; and moving the robot to corrected positions of the teaching point positions before correction, at the time of moving the robot to the teaching points before correction.

In other words, according to the eighth aspect, the robot is moved to a corrected position of a teaching point position before correction obtained based on a position correction amount, in the correction operation of plural teaching point positions. The corrected position becomes relatively close to a corrected teaching point. Therefore, a robot moving distance after the robot is moved to the corrected position becomes short, thereby shortening the time required for the correction operation. When the number of corrected teaching point positions increases by sequentially carrying out the correction operation, precision of the position correction amount becomes high. Therefore, even when a posture change of the robot or a tool is relatively large, a robot moving distance from the corrected teaching point position can be further shortened. Accordingly, the correction operation can be carried out accurately in a short time.

According to a ninth aspect, in the eighth aspect, the position correction amount is recalculated each time when one or plural teaching points are corrected.

In other words, according to the ninth aspect, teaching points of the operation program can be collectively corrected based on a position correction amount obtained by a separate operation program.

The object, characteristics and advantages of the present invention as well as other objects, characteristics and advantages of the invention will become clearer from detailed explanations of representative embodiments of the present invention shown in the accompanying drawings.

DETAILED DESCRIPTION

Figure 1:
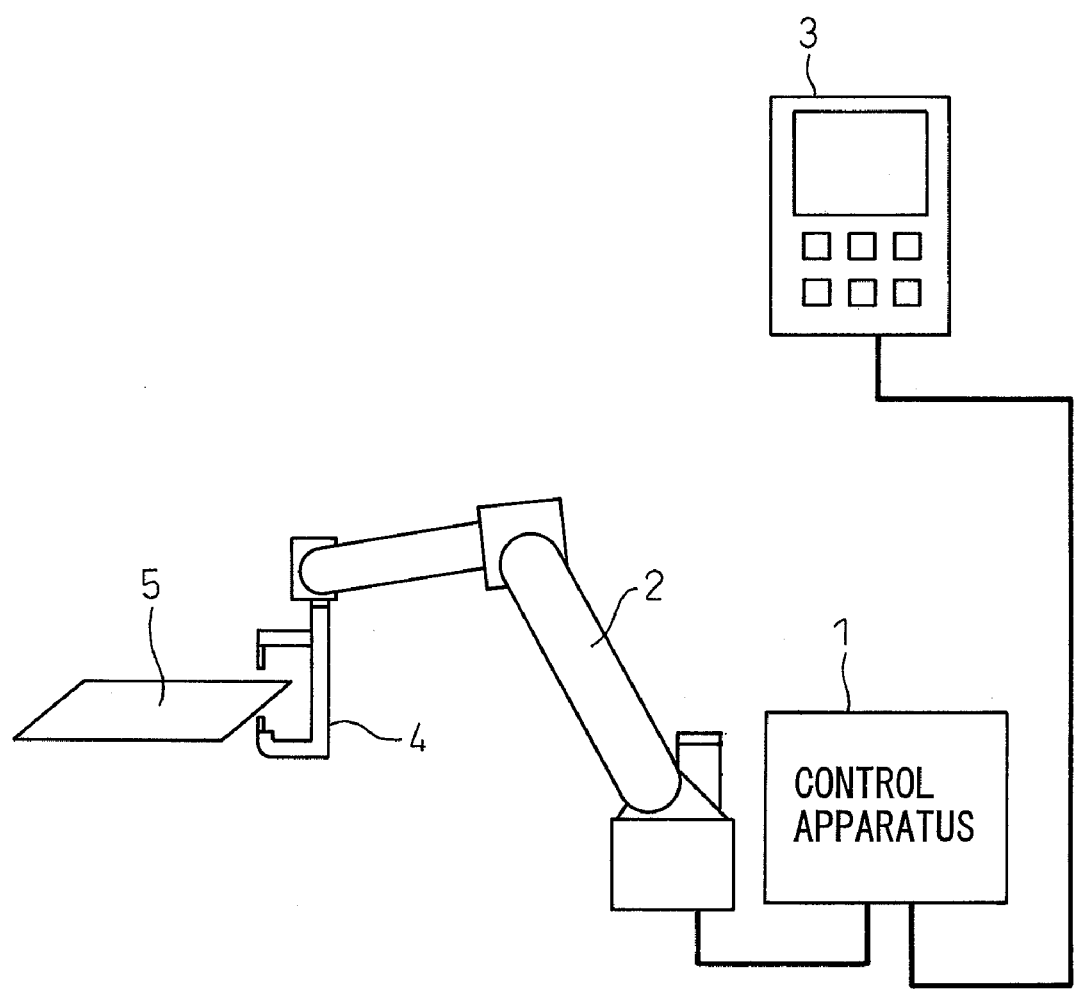
FIG. 1 is a configuration diagram of a robot control apparatus according to one embodiment of the present invention.

Embodiments of the present invention are explained below with reference to the accompanying drawings. In the following drawings, similar members are assigned like reference numerals. In order to facilitate the understanding, the scales of the drawings are suitably changed.

FIG. 1 is a configuration diagram of a robot control apparatus according to one embodiment of the present invention. A robot 2 is connected to a robot control apparatus 1. The robot control apparatus 1 is a teaching playback type robot control apparatus, and has functions of generating, storing, teaching, and playing-back a program of operating the robot 2. As shown in FIG. 1, the robot control apparatus 1 is connected to a teaching console 3, having a display screen, in order to carry out various operations of the robot such as a jog feed (a manual operation) of the robot and generation of a program.

An operation tool 4 for carrying out a predetermined operation to a workpiece 5 is mounted on a front end of an arm of the robot 2. In FIG. 1, the workpiece 5 is a sheet metal of an automobile body, for example. The workpiece 5 is fixed by a fixing tool not shown, and is set in front of the robot 2 at a constant position and in a constant posture.

The operation tool 4 is a spot welding gun, for example. The spot welding gun 4 carries out spot welding by opening and closing a welding chip at the front end of the tool with a servo motor. The robot control apparatus 1 controls the servo motor of the spot welding gun 4 to open and close the welding chip of the spot welding gun 4. The operation tool 4 and the robot control apparatus 1 are connected to a power supply unit for spot welding not shown. The operation tool 4 carries out a welding operation based on an instruction from the robot control apparatus 1. This spot welding gun 4 is well known in the art and, therefore, a detailed explanation is omitted here.

Figure 2:
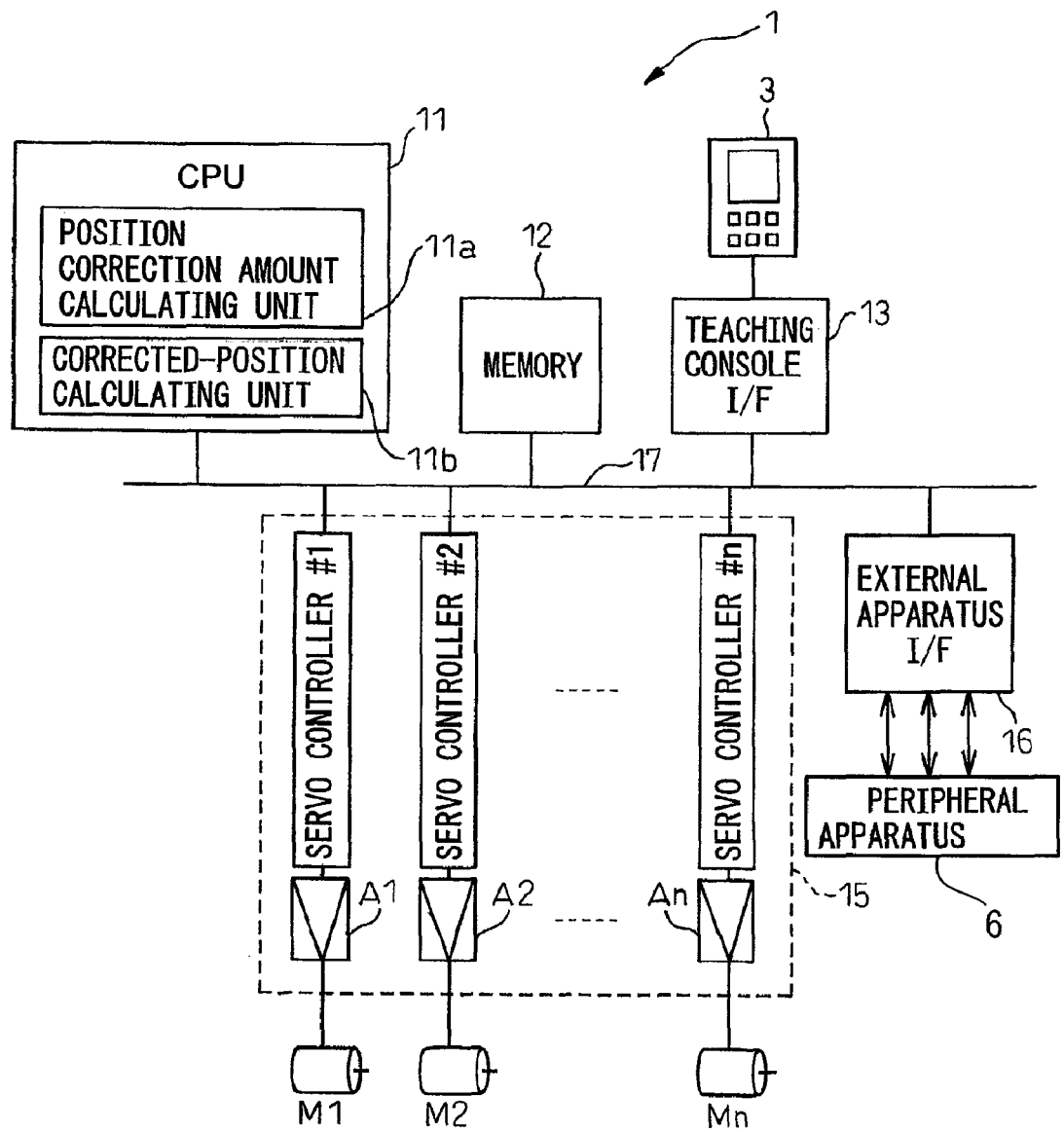
FIG. 2 is a block diagram of relevant parts of the robot control apparatus according to the embodiment.

FIG. 2 is a block diagram of relevant parts of the robot control apparatus 1 having the same configuration as that of a conventional robot control apparatus. The robot control apparatus 1 includes: a CPU 11; a memory 12 including a RAM, a ROM, and a nonvolatile memory (such as an EEPROM); a teaching console interface 13; an external apparatus interface 16 for an external apparatus such as a peripheral apparatus 6; and a servo control unit 15 that controls each part of the robot 2 to properly move the robot 2. The teaching console 3 having a display screen is connected to the teaching console interface 13.

The CPU 11 executes an operation program of the robot 2 and the process shown in a flowchart described later. The CPU 11 can play a role of a position correction amount calculating unit 11a that calculates a position correction amount of corrected teaching point positions for teaching point positions before correction in the operation program, and a role of a corrected-position calculating unit 11b that calculates a corrected position of teaching point positions, before correction, based on the position correction amount. The position correction amount calculating unit 11a and the corrected-position calculating unit 11b are described later.

A system program that supports basic functions of the robot 2 and the robot control apparatus 1 is stored in the ROM of the memory 12. The nonvolatile memory of the memory 12 stores an operation program of the robot 2 and relevant setting data generated by an offline programming apparatus and input via a communication line or a storage medium not shown. The RAM of the memory 12 is used as a storage area for temporarily storing data of various kinds of processing carried out by the CPU 11, such as a correction matrix A, described later, for example.

The servo control unit 15 includes servo controllers #1 to #n (n: a total number of axes of the robot, or a total number of axes of the robot added by a number of movable axes of the tool fitted to the robot wrist according to need). Each of the servo controllers #1 to #n includes a processor, a ROM, and a RAM, and carries out a loop control of a position and a speed of the servo motor that drives each axis of the robot, and a current loop control. Each of these servo controllers forms a digital server controller that carries out a loop control of a position, a speed, and current by software. The outputs of servo controllers #1 to #n drive control the servo motors M1 to Mn of joint axes of the robot 2 via servo amplifiers A1 to An, respectively. Although not shown, a position and speed detector is fitted to each of the servo motors M1 to Mn. A position and a speed of each servo motor detected by the position and speed detector are fed back to a corresponding one of the servo controllers #1 to #n. A sensor provided in the peripheral apparatus 6 is connected to the external apparatus interface 16.

The robot control apparatus 1 shown in FIG. 1 generates and stores a program for carrying out spot welding on the workpiece 5 fixed to the fixing tool not shown. This program contains plural teaching points concerning positions of the robot 2, especially the operation tool 4. The teaching point positions in the program need to be corrected at the time of moving the robot from a certain plant to other plant, at the time of moving the robot from a certain position to other position within the same plant, or at the time of actually applying an operation program generated by the offline programming apparatus to the robot. It is difficult to set a relative positional relationship between the robot 2 and the fixing tool before and after the robot is moved. It is difficult to actually build up a relative positional relationship between elements, such as between the robot 2 and the workpiece 5, so as to become equivalent to a relative positional relationship between the elements in a model of an operation program prepared offline. Even when a positional relationship before a movement of the robot is measured and the robot is set to keep this positional relationship after the robot is moved, there occurs an error of a few mm to a few dozens of mm due to an error of measurement and setting of the robot. Therefore, after the robot is moved or when the operation program prepared in offline is to be applied to the robot, teaching points of the program need to be corrected without exception.

In the teaching point correction operation carried out by the robot control apparatus 1 according to the present invention, the robot control apparatus 1 is switched to a teaching point correction mode at the time of correcting positions of teaching points, thereby carrying out the operation suitable to correct the teaching point position. The operation mode can be changed over by switching a teaching mode switch button (not shown) on the teaching console 3, or by switching the operation mode of the control apparatus 1 to the position correction mode, in a menu operation on the teaching console 3.

Figure 3:
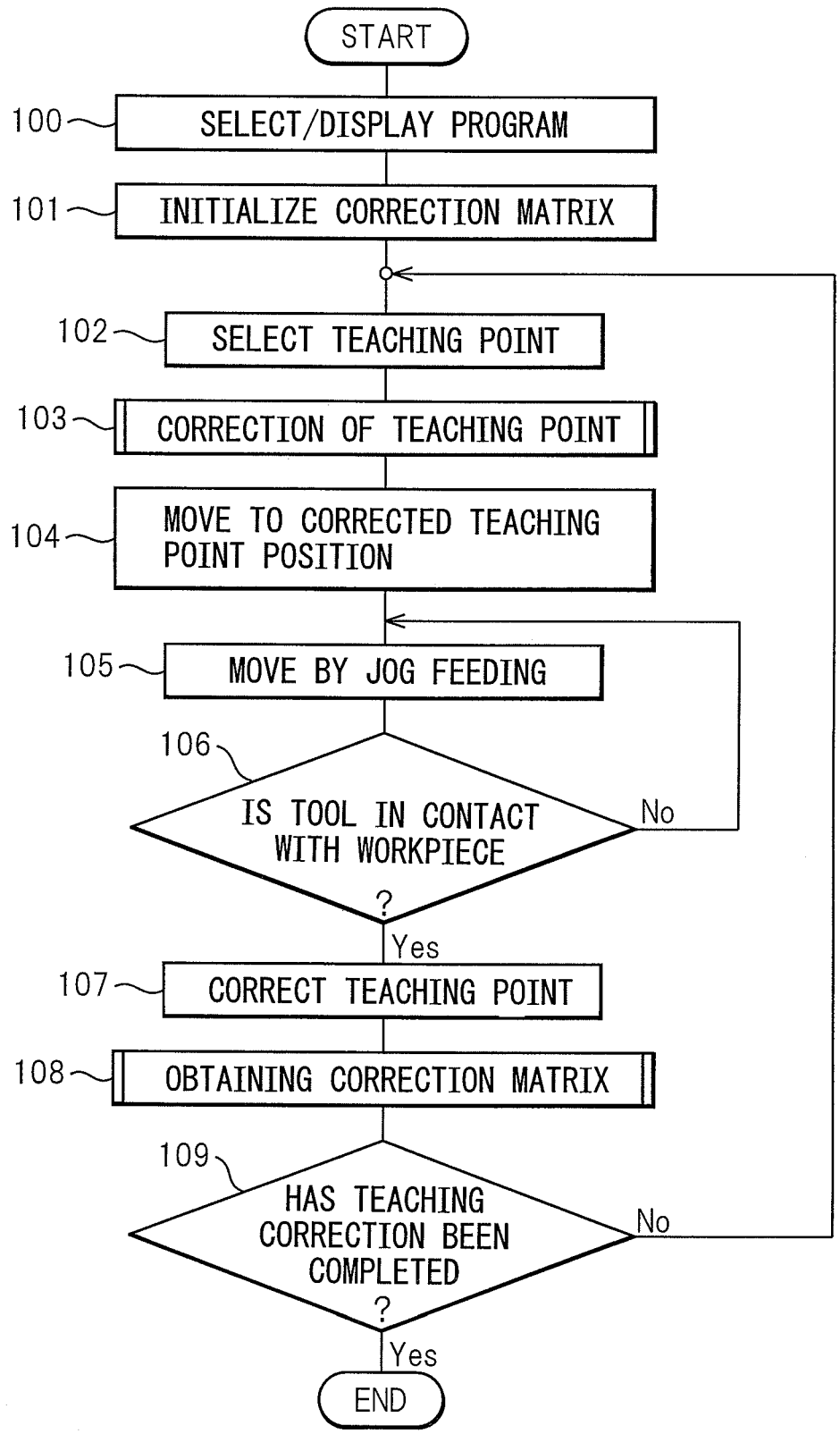
FIG. 3 is a flowchart showing a process of correcting teaching points according to the present invention.

FIG. 3 is a flowchart showing a process of correcting teaching points according to the present invention. When the operation mode is switched to the teaching point position correction mode by the above operation at step 100, a selected operation program of the robot 2 is displayed on the display screen of the teaching console 3. With this arrangement, a correction matrix for correcting a teaching position is initialized (step 101). The correction matrix A is a 3×4 type matrix including 12 elements. This matrix is initialized as shown in the following expression (a). Details of the correction matrix A are described later.

$$A = \begin{bmatrix} 1 & 0 & 0 & 0 \\ 0 & 1 & 0 & 0 \\ 0 & 0 & 1 & 0 \end{bmatrix} \quad (a)$$

At step 102, a teaching point to be corrected is selectively specified from the operation program displayed on the display screen of the teaching console 3. Because a positional relationship between the robot 2 and the workpiece 5 is changed before and after the robot 2 is moved, when the robot 2 is directly moved to a teaching point before correction, there is a possibility that the operation tool 4 of the robot 2 is brought into contact with the workpiece 5. Therefore, it is preferable that the robot 2 is stopped immediately before the teaching position of the teaching point.

Therefore, at step 103 in FIG. 3, a selected teaching point is corrected as described later, and the robot 2 is moved to a corrected teaching point at step 104. Based on the above operation, the operation tool 4 is prevented from being brought into contact with the workpiece 5. When the correction matrix A is not yet prepared, the process at step 103 is not carried out.

When the robot 2 moves to a corrected teaching position, an operator moves the robot 2 by jog feeding (manual feeding) using the teaching console 3. As a result, the operation tool 4 of the robot 2 is located at a desired position in a desired posture relative to the workpiece 5 (step 105). Because the above correction operation is carried out, a moving distance of the robot according to the jog feed can be shortened. If the operation tool 4 is a spot welding gun, for example, the robot 2 is moved such that the welding chip at the front end of the operation tool 4 is brought into contact with sheet metal as the workpiece 5.

After the jog feed is completed, it is decided at step 106 whether the operation tool 4 is brought into contact with the workpiece 5. Whether the operation tool 4 is brought into contact with the workpiece 5 is determined using a camera (not shown) that can image the front end of the work tool 4.

Alternatively, a contact determining unit that can determine a contact between the operation tool 4 and the workpiece 5 can be provided to determine the contact. For example, the operation tool 4 is applied with a voltage. When the operation tool 4 and the workpiece 5 (the workpiece is grounded) are electrically connected based on a contact between the operation tool 4 and the workpiece 5, the contact determining unit detects a change in the current flowing through the operation tool 4 or a change in the voltage. With this arrangement, the contact determining unit can detect a contact between the operation tool 4 and the workpiece 5. When the operation tool 4 is a spot welding gun, a circuit that detects a contact can be provided using a circuit within the welding power supply (not shown). Similarly, a power supply circuit that drives the operation tool can be used. Alternatively, during a jog feeding, presence of a contact between the operation tool 4 and the workpiece 5 can be determined based on a current value of the motor of the robot. The robot can be stopped when the operation tool 4 and the workpiece 5 are contacted to each other.

Alternatively, a disturbance estimating observer is built in the motor control apparatus of the robot. The disturbance estimating observer can estimate a disturbance torque, thereby detecting a contact between the operation tool 4 and the workpiece 5. Alternatively, a proximity sensor can be fitted to a near position of the front end of the welding chip of the operation tool 4. The proximity sensor can determine a contact by detecting that a distance between the chip and the workpiece 5 becomes equal to or smaller than a predetermined value.

When it is determined at step 106 that the operation tool 4 and the workpiece 5 are not in contact to each other, the process returns to step 105. The above process is repeated until when the operation tool 4 and the workpiece 5 are brought into contact with each other, namely until when it is confirmed that the operation tool 4 is at a desired position and in a desired posture relative to the workpiece 5.

After the operation tool 4 is set at a desired position and in a desired posture, a correction instruction is input from the teaching console 3 at step 107. As a result, the position and the posture of the robot 2 at this time are used to correct the teaching point as a new teaching position.

When the teaching point is corrected, at step 108, the robot control apparatus 1 calculates the correction matrix A for correcting the positions of the teaching points, based on a position correction amount of the teaching points corrected so far. When the correction matrix A is already calculated, the correction matrix A is calculated again. As described later, the correction matrix A is not calculated when three or more teaching points are not corrected. When the correction matrix A has not yet been calculated, step 108 in FIG. 3 can be skipped. A detailed process of obtaining the correction matrix A is described later. When the correction matrix A is once generated, the correction matrix A is stored into the RAM of the memory 12.

At step 109, it is determined whether the correction operation of all the plural teaching points which the operator wants in the operation program has ended. When the correction operation of all the plural teaching points which the operator wants has not ended, the process returns to step 102, and the process is repeated until when the correction operation of all the plural teaching points which the operator wants has ended. Naturally, the correction matrix A is recalculated each time the operation is repeated. After the correction operation of all the teaching points ends, the operator cancels the teaching point correction mode.

Figure 4:
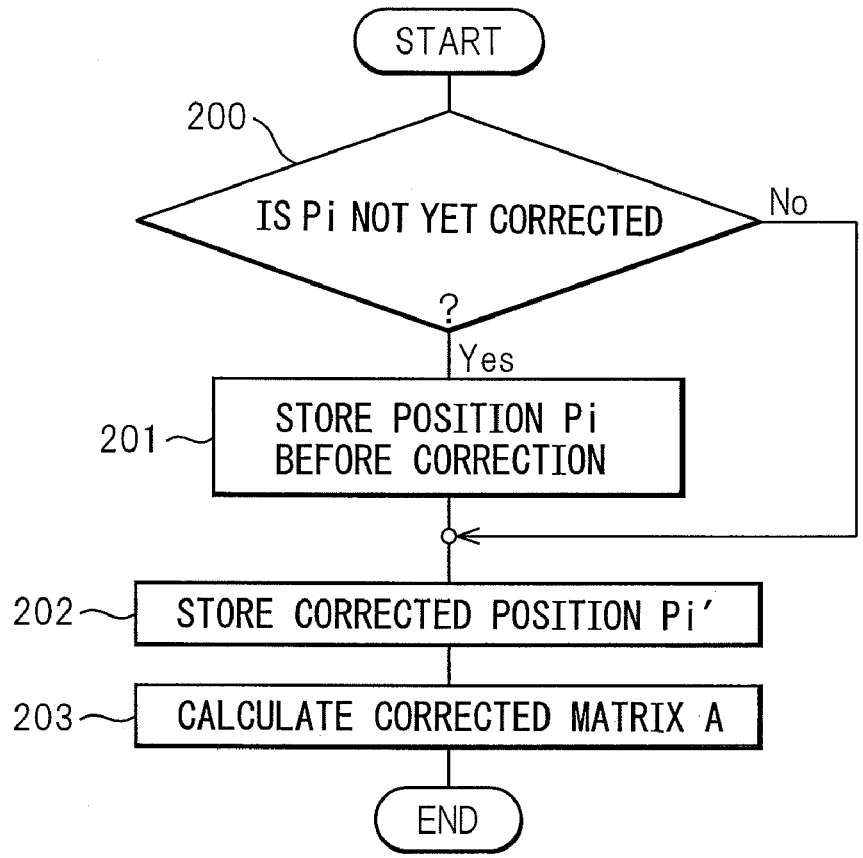
FIG. 4 is a flowchart showing a process of calculating a correction matrix according to the present invention.

A method of calculating the correction matrix A at step 108 in FIG. 3 is explained with reference to a flowchart in FIG. 4 showing a process of calculating the correction matrix. As can be seen from the explanation described later, the correction matrix A corresponds to a position correction amount of the teaching points before correction. Therefore, the position correction amount calculating unit 11a of the CPU 11 calculates the correction matrix A.

The memory 12 of the present invention such as a nonvolatile memory stores a table as shown in Table 1.

TABLE 1

| Position number | Position before correction | Position after correction |
|---|---|---|
| 1 | P1 (x1, y1, z1) | P1' (x1', y1', z1') |
| 2 | P2 (x2, y2, z2) | P2' (x2', y2', z2') |
| . | . | . |
| . | . | . |
| . | . | . |
| n | Pn (xn, yn, zn) | Pn' (xn', yn', zn') |

As shown in Table 1, the table stores position numbers of teaching points within the operation program, three-dimensional positions of teaching points before correction, and three-dimensional positions of teaching points after correction corresponding to these position numbers. However, at the time of initializing the correction matrix A at step 101 in FIG. 3, the table is also initialized to a state that there are no contents in "Position number", "Position before correction", and "Position after correction".

At the time of calculating the correction matrix A at step 108 in FIG. 3, it is determined at step 200 in FIG. 4 whether a teaching point Pi (where "i" is a natural number equal to or larger than 1 and equal to or smaller than n) is already corrected after the initialization at step 101. The determination at step 200 is carried out depending on whether a number "i" is present in the item of "Position number" in the table shown in Table 1.

When the teaching point Pi is not yet corrected, that is, when the number "i" is not present in the item of "Position number", the process proceeds to step 201. The position number i and a three-dimensional position (xi, yi, zi) of the teaching point before correction Pi are stored at corresponding positions in the table. On the other hand, when the teaching point Pi is already corrected, that is, when the number "i" is already registered in the item of "Position number", the process at step 201 is skipped. Then, at step 202, a current robot position, that is, a three-dimensional position Pi' (xi', yi', zi') of the teaching point after correction is stored at a corresponding position in the table.

In this way, each time when the position of the teaching point Pi is corrected, the position number Pi, the teaching point position before correction Pi (xi, yi, zi), and the teaching point position after correction Pi' (xi', yi', zi') are sequentially stored in the table (see Table 1). Therefore, in the middle of the correction operation, position numbers, teaching point positions before correction, and teaching point positions after correction at all teaching points corrected up to this time are stored in the table.

Then, at step 203, the correction matrix A is calculated using data of all the teaching points Pi and Pi' stored in the table of Table 1 at this point of time. In this case, a coordinate conversion matrix A for converting the teaching point before correction Pi into the teaching point after correction Pi' is calculated using the method of least squares, for example (see the expression (1)).

$$Pi' = [A]Pi \quad (1)$$

When the coordinate conversion matrix A is given as shown in the expression (b), the expression (1) is shown by the following expression (c).

$$A = \begin{bmatrix} a11 & a12 & a13 & a14 \\ a21 & a22 & a23 & a24 \\ a31 & a32 & a33 & a34 \end{bmatrix} \quad (b)$$

$$\begin{bmatrix} Pi' \\ 1 \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} Pi \\ 1 \end{bmatrix} \quad (c)$$

The expression (c) is expressed by the following three expressions (2) to (4).

$$xi' = a11 \cdot xi + a12 \cdot yi + a13 \cdot zi + a14 \quad (2)$$

$$yi' = a21 \cdot xi + a22 \cdot yi + a23 \cdot zi + a24 \quad (3)$$

$$zi' = a31 \cdot xi + a32 \cdot yi + a33 \cdot zi + a34 \quad (4)$$

A partial matrix R (see expression (d)) given by a first column to a third column of the matrix A expresses a rotation movement of the robot 2. A matrix T (see expression (e)) given by a fourth column of the matrix A expresses a parallel movement of the robot 2.

$$R = \begin{bmatrix} a11 & a12 & a13 \\ a21 & a22 & a23 \\ a31 & a32 & a33 \end{bmatrix} \quad (d)$$

$$T = \begin{bmatrix} a14 \\ a24 \\ a34 \end{bmatrix} \quad (e)$$

In general, when a set of a teaching point before correction Pi and a teaching point after correction Pi' for three or more different points that are not in the same straight line is known, the parameters a11 to a34 of the matrix A can be obtained. Further, when a set of a teaching point before correction Pi and a teaching point after correction Pi' for four or more different points that are not in the same one straight line is known, the parameters a11 to a34 that minimize a squared sum of position errors before and after conversion can be calculated according to the Newton method or the method of least squares such as a general inverse matrix. Because these calculation methods are known, explanations are omitted here.

When only one or two teaching points after correction Pi' are known, or when teaching points after correction Pi' are present in the same straight line, the partial matrix R expressing the rotation movement of the coordinate conversion matrix A cannot be obtained. In this case, the coordinate conversion matrix A may be obtained by adding an average value of a position correction amount for the teaching point after correction Pi', assuming that there is no rotation movement. In this case, the parameters a11 to a34 of the matrix A can be expressed as shown in the following expression (f). When the number of teaching points after correction Pi' is not sufficient to prepare the correction matrix A, the process at step 108 in FIG. 3 may be skipped, and the correction matrix A may be calculated after obtaining three or four teaching points Pi'.

$$\begin{bmatrix} a11, & a12, & a13, & a14 \\ a21, & a22, & a23, & a24 \\ a31, & a32, & a33, & a34 \end{bmatrix} = \begin{bmatrix} 1, & 0, & 0, & \sum (xi' - xi)/n \\ 0, & 1, & 0, & \sum (yi' - yi)/n \\ 0, & 0, & 1, & \sum (zi' - zi)/n \end{bmatrix} \quad (f)$$

Figure 5:
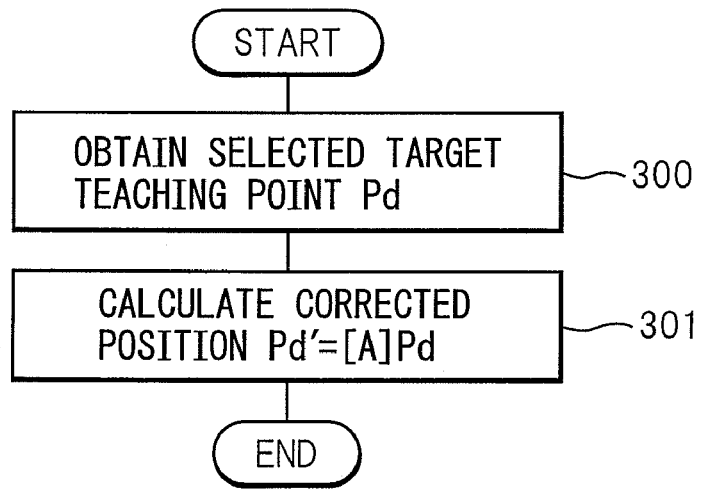
FIG. 5 is a flowchart showing a process of calculating a corrected position according to the present invention.

The correction operation of the teaching point at step 103 in FIG. 3 is explained with reference to FIG. 5. It is assumed that the corrected-position calculating unit 11b of the CPU 11 carries out this operation. At step 300 in FIG. 5, the corrected-position calculating unit 11b obtains one target teaching point Pd selected by the operator. Then, at step 301, the corrected-position calculating unit 11b converts the target teaching point Pd using the matrix A as shown in the following expression (5), thereby obtaining a corrected teaching point Pd'. After that, at step 104 in FIG. 3, the robot 2 is moved to the corrected teaching point Pd'.

$$Pd' = [A]Pd \quad (5)$$

When the matrix A is not yet calculated, it is clear that the process at step 103 in FIG. 3 is skipped, as described above.

In this way, according to the present invention, each time when one teaching point Pi is corrected, the correction matrix A is calculated again based on the flowchart shown in FIG. 4. Therefore, when the number of corrected teaching points increases, the correction matrix A can be obtained based on more teaching point data. Accordingly, precision of the correction matrix A is improved. When the corrected teaching point Pd' is obtained more accurately using the matrix A of high precision, and when the robot 2 is moved to this position, the rest of jog feeding can be minimized. Consequently, total time required to correct the operation program can be shortened. Therefore, according to the present invention, even when a posture change of the robot or the tool is relatively large, a moving distance of the robot from the corrected teaching point Pd' can be short. As a result, the correction operation can be carried out accurately and in shorter time.

In the present invention, when the correction matrix A or the position correction amount is obtained, all the remaining uncorrected teaching point positions can be collectively corrected. In this case, all the plural teaching point positions do not need to be corrected. Therefore, the correction operation can be further shortened. Further, in this case, because the correction operation is carried out based on the content corrected by the same operation program, the remaining uncorrected teaching points can be corrected accurately. According to the method based on the present invention, a touchup operation is not necessary at the time of correcting the program. Therefore, labor and time necessary for the touchup operation can be omitted.

Figure 6:
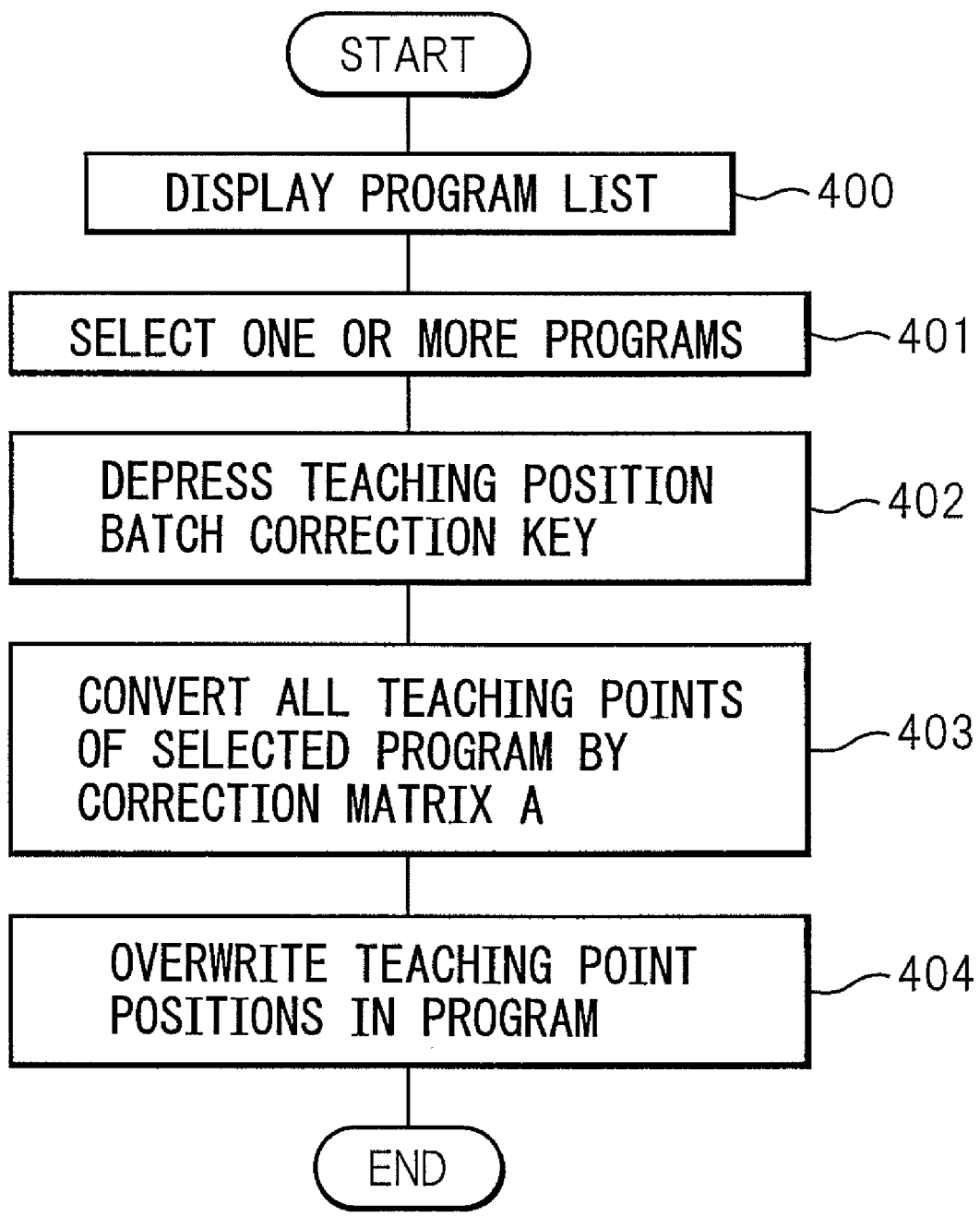
FIG. 6 is a flowchart showing a process of collectively correcting teaching positions of a separate program using a result of correcting teaching points of a certain program.

FIG. 6 is a flowchart showing a process of collectively correcting teaching positions of a separate program using a result of correcting teaching points of a certain program. The following process is applied when the correction matrix A has been prepared in a state that all teaching points in a certain operation program are corrected, or when at least the correction matrix A has been prepared by correcting a minimum number of teaching points. At step 400 in FIG. 6, an operator depresses a program list key (not shown) of the teaching console 3, thereby displaying a list of plural programs. Then, at step 401, the operator selects a separate program in which the operator wants the teaching point positions to be collectively corrected, from the list of programs. To carry out this operation, the operator matches a cursor to the desired program in the program list, and depresses a decision key (not shown) on the teaching console 3.

At step 402, the operator depresses a batch correction key (not shown) of teaching positions on the teaching console 3. Accordingly, all the teaching points in the desired program are converted to update the teaching position data of the program, using the latest correction matrix A stored in the memory 12 (steps 403, 404). As a result, a teaching point correction carried out in a certain program can be applied to a separate program, thereby correcting the teaching points in this separate program in an extremely short time. It can be understood from this fact that this correction is advantageous for one robot 2 to operate based on each of plural operation programs.

Figure 7:
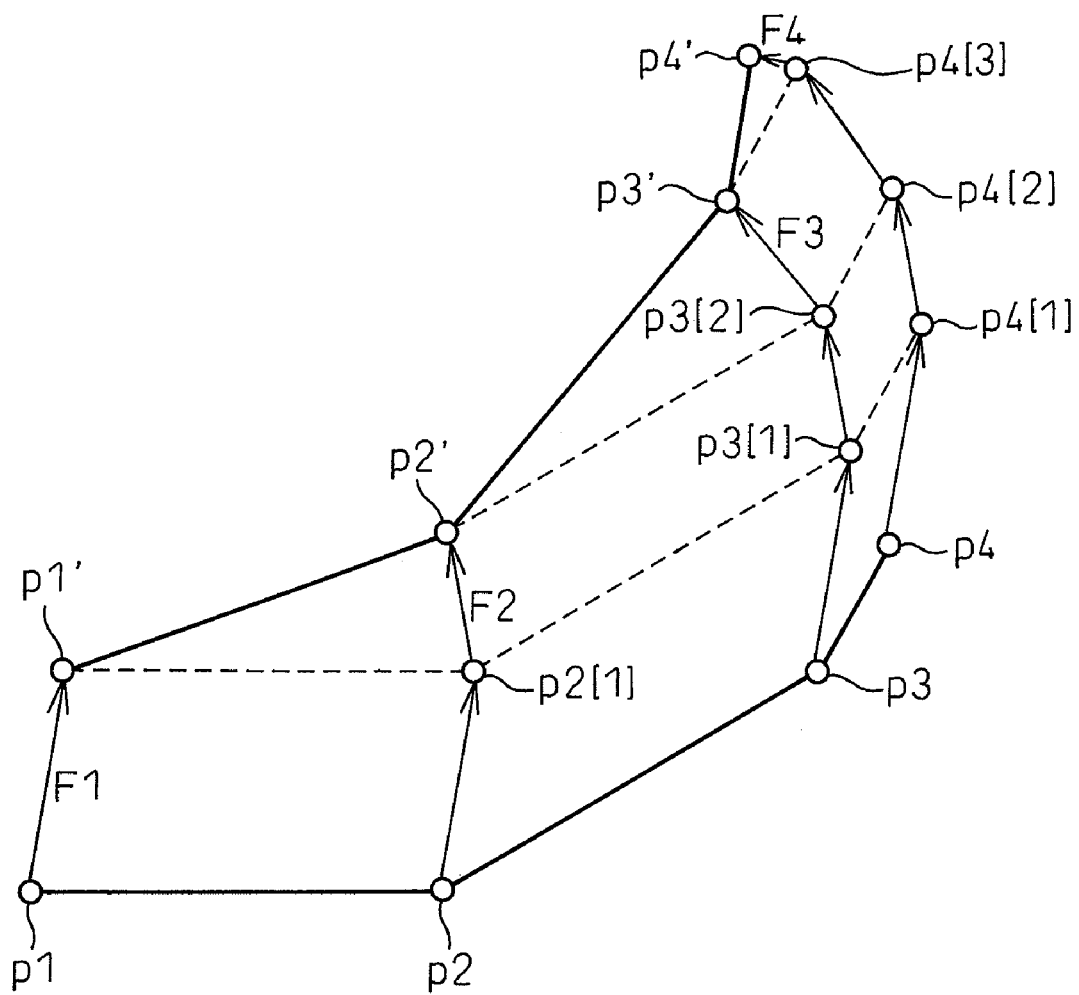
FIG. 7 is an explanatory diagram of a teaching position correction operation according to a conventional technique.
Figure 8:
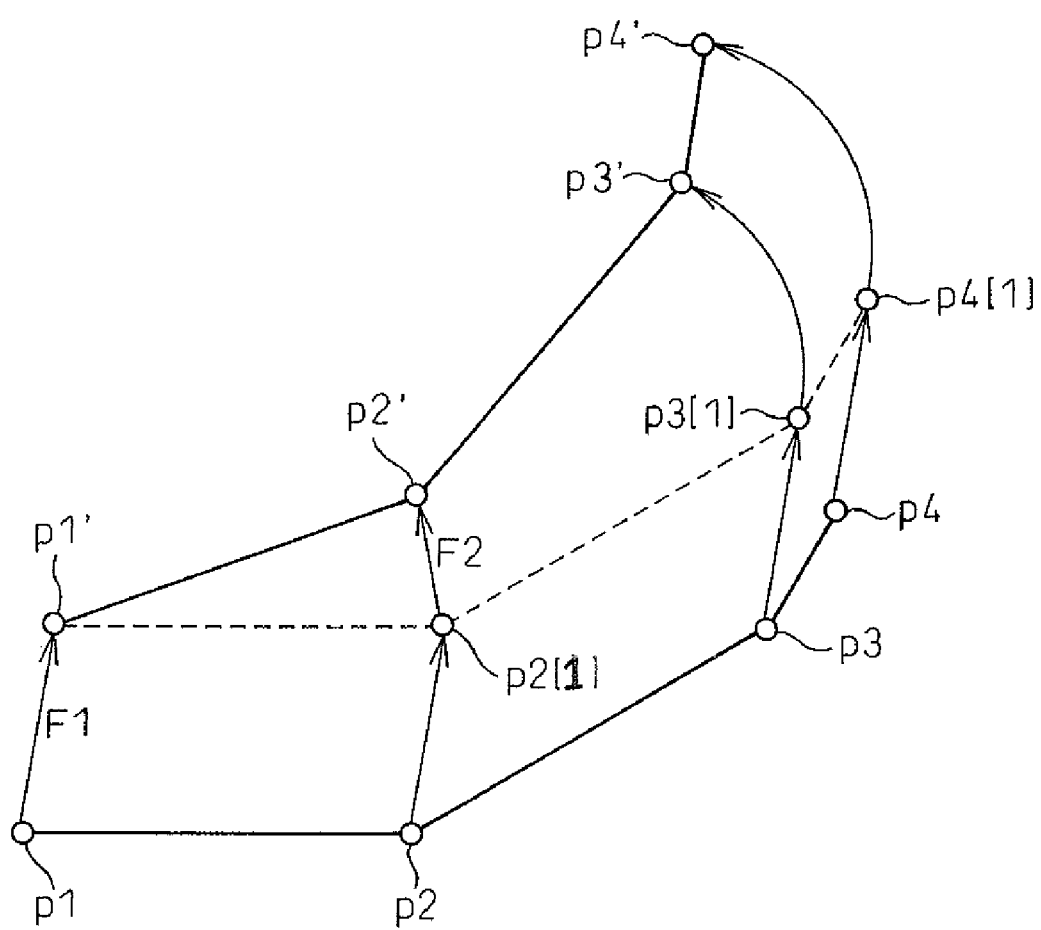
FIG. 8 is an explanatory diagram of a teaching position correction operation according to the present invention.

FIG. 7 is an explanatory diagram of a teaching position correction operation according to a conventional technique, and FIG. 8 is an explanatory diagram of a teaching position correction operation according to the present invention. A conventional teaching position correction method and a teaching position correction method according to the present invention are compared with each other with reference to FIG. 7 and FIG. 8. In these drawings, to facilitate the explanation, all teaching points are disposed on the same plane.

In these drawings, p1 to p4 denote teaching points before correction, and p1' to p4' denote teaching points after correction. In the drawings, pi [j] denotes a position of the teaching point pi after a j-th correction of the teaching point (including a parallel movement). In FIG. 7 and FIG. 8, the teaching points p1 to p4 are corrected to match the teaching points p1' to p4'.

In FIG. 7, when the teaching point p1 is corrected to the corrected teaching point p1', the subsequent teaching points p2, p3, p4 are moved in parallel by the amount equivalent to a difference between the teaching point p1 and the corrected teaching point p1', and are moved to points p2 [1], p3 [1], p4 [1], respectively, as shown in FIG. 7.

Next, a second correction operation of the teaching points is carried out so that the point p2 [1] moved in the first correction operation becomes the corrected teaching point p2'. As shown in FIG. 7, the points p3 [1] and p4 [1] are moved in parallel to points p3 [2] and p4 [2] respectively, based on the second teaching-point correction operation.

Thereafter, a third teaching-point correction is carried out so that the point p3 [2] becomes the corrected teaching point p3'. Accordingly, the point p4 [2] is moved in parallel to a point p4 [3]. Further, a fourth teaching-point correction (a parallel movement) is carried out so that the point p4 [3] becomes the corrected teaching point p4'.

When a positional change from the teaching points p1 to p4 to the corrected teaching points p1' to p4' is only a parallel movement (without a rotation movement), the teaching points p2 to p4 can be matched with the corrected teaching points p2' to p4', based on the first teaching-point correction operation for correcting the teaching point p1 to the corrected teaching point p1'. However, when the positional change from the teaching points p1 to p4 to the corrected teaching points p1' to p4' includes both of a parallel movement and a rotation movement, all the teaching points cannot be matched with the corrected teaching points based on only the parallel movement. When the positional change of the teaching points includes the rotation movement, the correction operation needs to be carried out to all teaching points, as described with reference to FIG. 7.

According to the teaching position correction operation of the present invention shown in FIG. 8, in the first teaching-point correction operation of moving the teaching point p1 to the corrected teaching point p1', the subsequent teaching points p2, p3, p4 are moved in parallel to the points p2 [1], p3 [1], p4 [1], respectively. This operation is similar to that shown in FIG. 7.

Next, the second teaching-point correction operation is carried out so that the point p2 [1] becomes the corrected teaching point p2'. In this case, a teaching correction amount of the points p3 [1] and p4 [1] is calculated from the teaching correction amount in the first teaching-point correction operation and the second teaching-point correction operation.

According to the method of the present invention, the coordinate conversion matrix A of converting the teaching points p1 and p2 to the corrected teaching points p1' and p2' is obtained based on the teaching-point correction operation for the teaching points p1 and p2. The positions of the teaching points p3 and p4 can be corrected by the coordinate conversion matrix A, thereby obtaining the corrected teaching points p3' and p4'. Therefore, all the four teaching points can be matched by carrying out the teaching point correction operation at two times. Consequently, according to the present invention, plural teaching points within the operation program can be corrected accurately in short time.

While the present invention has been explained using representative embodiments, it can be understood that those skilled in the art can carry out the above modifications and various other modifications, omissions, and additions, without deviating from the range of the present invention.

The invention claimed is:

1. A teaching position correcting apparatus for correcting positions of a plurality of teaching points of a robot in a robot operation program by moving the robot to each of the plurality of teaching points and by reading a current position of the robot at said each of the plurality of teaching points,
wherein the teaching point correcting apparatus comprises:
a position correction amount calculating unit, a corrected-position calculating unit, and a moving unit;
wherein, each time when a teaching point is corrected by a first position correction amount,
the position correction amount calculating unit calculates a second position correction amount based on (i) positions after correction of two or more previously or currently corrected teaching points among the plurality of teaching points and (ii) positions before correction of the previously or currently corrected teaching points;
based on the second position correction amount, the corrected-position calculating unit calculates corrected positions of remaining teaching points which are not currently or previously corrected; and
the moving unit moves the robot to the corrected positions of the remaining teaching points; and
wherein the second position correction amount is different from the first position correction amount, and includes at least rotational movement of the robot.

2. The teaching position correcting apparatus according to claim 1,
wherein the robot operation program is generated by an offline programming apparatus.

3. The teaching position correcting apparatus according to claim 1, wherein the robot operation program is generated before a relative positional relationship between the robot and a workpiece changes, and positions of the teaching points are corrected after the relative positional relationship between the robot and the workpiece changes.

4. The teaching position correcting apparatus according to claim 1, wherein positions before correction of the teaching points are within a robot operation program which is the same as the robot operation program containing the corrected positions of the teaching points.

5. The teaching position correcting apparatus according to claim 1, wherein positions before correction of the teaching points are within a robot operation program different from the robot operation program containing the corrected positions of the teaching points.

6. The teaching position correcting apparatus according to claim 1, further comprising a teaching console of the robot,
wherein the position correction amount calculating unit calculates the position correction amounts and the corrected-position calculating unit calculates the corrected positions of the teaching points, through the teaching console.

7. The teaching position correcting apparatus according to claim 1, wherein positions of a plurality of teaching points in another robot operation program are batch corrected based on the position correction amounts.

8. A teaching position correction method for correcting positions of a plurality of teaching points of a robot in a robot operation program by moving the robot to each of the plurality of teaching points and by reading a current position of the robot at said each of the plurality of teaching points,
wherein, each time when a teaching point is corrected by a first position correction amount, the teaching point correction method comprises:
calculating, by a processor, a second position correction amount based on (i) positions after correction of two or more previously or currently corrected teaching points among the plurality of teaching points and (ii) positions before correction of the previously or currently corrected teaching points;
based on the second position correction amount, calculating, by the processor, corrected positions of remaining teaching points which are not currently or previously corrected; and
moving the robot to the corrected positions of the remaining teaching points,
wherein the second position correction amount is different from the first position correction amount, and includes at least rotational movement of the robot.

9. The teaching position correction method according to claim 8, wherein positions of a plurality of teaching points in another robot operation program are batch corrected based on the position correction amounts.

* * * * *